United States Patent
Ai et al.

(10) Patent No.: US 11,645,619 B2
(45) Date of Patent: May 9, 2023

(54) MATERIAL HANDLING METHOD, EQUIPMENT, STORAGE MEDIUM AND COMPUTER DEVICE

(71) Applicant: HAI ROBOTICS CO., LTD., Shenzhen (CN)

(72) Inventors: Xin Ai, Shenzhen (CN); Hao Yang, Shenzhen (CN)

(73) Assignee: HAI ROBOTICS CO., LTD., Shenzhen (CN)

(*) Notice: Subject to any disclaimer, the term of this patent is extended or adjusted under 35 U.S.C. 154(b) by 15 days.

(21) Appl. No.: 17/320,865

(22) Filed: May 14, 2021

(65) Prior Publication Data

US 2021/0287170 A1    Sep. 16, 2021

Related U.S. Application Data

(63) Continuation of application No. PCT/CN2019/117974, filed on Nov. 13, 2019.

(30) Foreign Application Priority Data

Nov. 14, 2018 (CN) .......................... 201811353726.8

(51) Int. Cl.
*G06F 16/9035* (2019.01)
*G06F 9/38* (2018.01)
*G06Q 10/0875* (2023.01)

(52) U.S. Cl.
CPC ....... *G06Q 10/0875* (2013.01); *G06F 9/3836* (2013.01); *G06F 16/9035* (2019.01)

(58) Field of Classification Search
CPC ............ G06Q 10/0875; G06F 16/9035; G06F 9/3836
See application file for complete search history.

(56) References Cited

U.S. PATENT DOCUMENTS 8,335,585 B2 * 12/2012 Hansl .................. B65G 1/1378
                                                            700/214
2013/0275236 A1 * 10/2013 Koke .................. G07F 17/0078
                                                             705/15
(Continued)

FOREIGN PATENT DOCUMENTS

CN         101417732 A    4/2009
CN         106185152 A    12/2016
(Continued)

OTHER PUBLICATIONS

Silan Hun, "Algorithms for Dynamic Forward Area Allocation in a Warehouse", 2003, https://core.ac.uk/download/pdf/11739956.pdf (Year: 2003).*

(Continued)

*Primary Examiner* — Allen C Chein
(74) *Attorney, Agent, or Firm* — J.C. Patents

(57) ABSTRACT

A material handling method, the method includes: acquiring a material identification; where a material identified by the material identification is stored in a material box corresponding to the material identification; when an unprocessed order includes the material identification, then querying whether there is an available temporary storage unit in a temporary storage shelf; and triggering a temporary storage instruction when there is an available temporary storage unit in the temporary storage shelf; where the temporary storage instruction is used to instruct to perform a temporary storage behavior triggered according to the material identification on the temporary storage shelf.

18 Claims, 7 Drawing Sheets

(56) References Cited

U.S. PATENT DOCUMENTS

| | | | |
|---|---|---|---|
| 2017/0313516 A1 | 11/2017 | Kazama | |
| 2018/0127212 A1* | 5/2018 | Jarvis | B60P 1/02 |
| 2019/0310655 A1* | 10/2019 | Voorhies | G06Q 50/28 |
| 2020/0005226 A1* | 1/2020 | Sikka | G06Q 10/087 |

FOREIGN PATENT DOCUMENTS

| | | |
|---|---|---|
| CN | 206569571 U | 10/2017 |
| CN | 108122082 A | 6/2018 |
| CN | 108313606 A | 7/2018 |
| CN | 109636269 A | 4/2019 |
| JP | H07165311 A | 6/1995 |
| JP | 2003192124 A | 7/2003 |
| JP | 2005089006 A | 4/2005 |
| JP | 2015214410 A | 12/2015 |
| JP | 2017141102 A | 8/2017 |

OTHER PUBLICATIONS

Gagliardi, "Space Allocation and Stock Replenishment Synchronization in a Distribution Center", 2008, https://citeseerx.ist.psu.edu/viewdoc/download?doi=10.1.1.589.2288&rep=rep1&type=pdf (Year: 2008).*

Bartholdi, "Allocating space in a forward pick area of a distribution center for small parts", 2008, http://opim-db-1.uspto.gov/stic/upload/667083/Allocating%20space%20in%20%20forward%20pick%20area%20of%20a%20distribution%20center%20for%20small%20parts.pdf (Year: 2008).*

Barry, "How to Improve Your Ecommerce Warehouse Slotting", Apr. 2018, https://multichannelmerchant.com/operations/improve-ecommerce-warehouse-slotting/ (Year: 2018).*

First Office Action of the priority CN application.

NPL: "Modern Production, Distribution and Emulation", chapter 2, pp. 25-28, authored by Xiaoping Zhang, published on Jan. 31, 1998.

First Office Action of the parallel application JP2021-526328.

\* cited by examiner

MATERIAL HANDLING METHOD, EQUIPMENT, STORAGE MEDIUM AND COMPUTER DEVICE

CROSS-REFERENCE TO RELATED APPLICATIONS

This application is a continuation of International Application No. PCT/CN2019/117974, filed on Nov. 13, 2019, which claims priority to Chinese Patent Application No. 201811353726. 8, filed on Nov. 14, 2018, both of which are hereby incorporated by reference in their entireties.

TECHNICAL FIELD

The present application relates to the field of computer technology, and in particular, to a material handling method, equipment, storage medium and computer device.

BACKGROUND

The rapid development of e-commerce has led to the development of the logistics industry. In daily e-commerce order processing process, it is necessary to load and unload a material. At present, manner of manual loading and unloading is generally used for loading and unloading of the material, which has low work efficiency. Moreover, during the loading and unloading, due to a considerable height difference between a container and the ground, it is often difficult to load and unload and consumes a lot of human and material resources, which leads to the problem of low efficiency of material handling. In addition, many materials are often required by multiple e-commerce orders, so the same material is often fetched and placed repeatedly in traditional technology, which further reduces the efficiency of material handling.

SUMMARY

According to various embodiments provided by the present application, a material handling method, equipment, storage medium and computer device are provided.

A material handling method, which is executed by a computer device, and the method includes:
acquiring a material identification; where a material identified by the material identification is stored in a material box corresponding to the material identification;
when an unprocessed order includes the material identification, then
querying whether there is an available temporary storage unit in a temporary storage shelf; and
triggering a temporary storage instruction when there is an available temporary storage unit in the temporary storage shelf; where the temporary storage instruction is used to instruct to perform a temporary storage behavior triggered according to the material identification on the temporary storage shelf.

A material handling equipment, including:
an acquiring module, configured to acquire a material identification; where a material identified by the material identification is stored in a material box corresponding to the material identification;
a querying module, configured to query whether there is an available temporary storage unit in a temporary storage shelf when an unprocessed order includes the material identification; and a temporary storage module, configured to trigger a temporary storage instruction when there is an available temporary storage unit in the temporary storage shelf; where the temporary storage instruction is used to instruct to perform a temporary storage behavior triggered according to the material identification on the temporary storage shelf.

A non-volatile storage medium storing computer-readable instructions, where the computer-readable instructions when executed by one or more processors, enable the one or more processors to execute steps of the above material handling method.

A computer device, including a memory and a processor, where computer-readable instructions are stored in the memory, and the computer-readable instructions when executed by the processor, enable the processor to execute steps of the above material handling method.

Details of one or more embodiments of the present application are set forth in the following accompanying drawings and description. Other features, objects and advantages of the present application will become apparent from the description, the accompanying drawings and the claims.

BRIEF DESCRIPTION OF DRAWINGS

In order to explain the technical solution in the embodiments of the present application more clearly, the following will briefly introduce the accompanying drawings needed in the description of the embodiments. It is obvious that the accompanying drawings in the following description are only some embodiments of the present application. For those skilled in the art, other accompanying drawings can be obtained according to these accompanying drawings without paying creative work.

DESCRIPTION OF EMBODIMENTS

In order to make objectives, technical solutions and advantages of the present application clearer, the present application will be further described in detail in combination with the accompanying drawings and embodiments. It should be understood that the specific embodiments described herein are only used for explaining the present application but are not used for limiting the present application.

Figure 1:
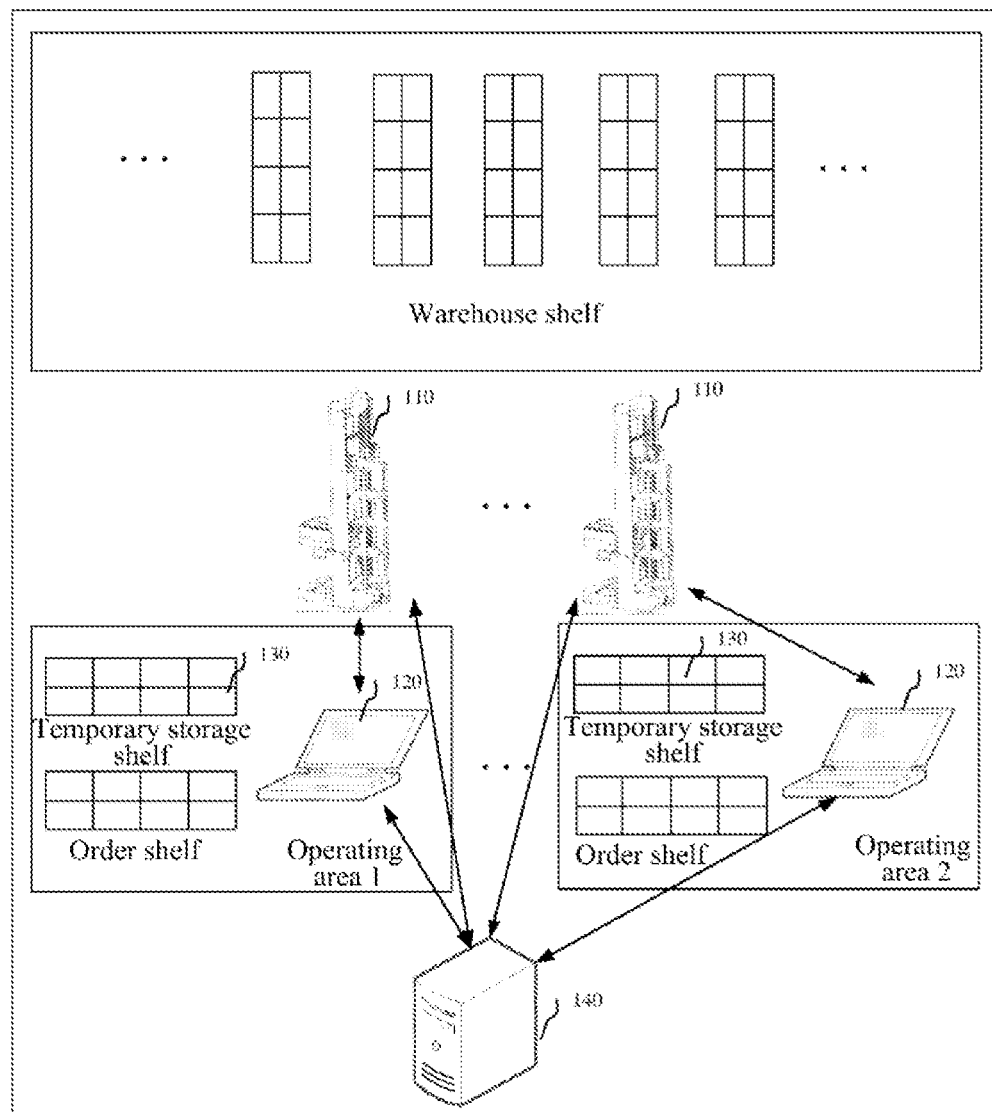
FIG. 1 is an application environment diagram of a material handling method in an embodiment.

FIG. 1 is an application environment diagram of a material handling method in an embodiment. Referring to FIG. 1, the material handling method is applied to a material handling system. The material handling system includes a warehouse robot 110, an operating terminal 120, a temporary storage shelf 130 and a server 140. The warehouse robot 110, the operating terminal 120 and the server 140 can be connected through a network. The warehouse robot 110, the operating terminal 120 and the server 140 can be independently used to execute the material handling method; and the warehouse robot 110, the operating terminal 120 and the server 140 can also cooperate to execute the material handling method. The operating terminal 120 may specifically be a desktop terminal or a mobile terminal, and the mobile terminal may specifically be at least one of a tablet computer or a notebook computer. The server 140 may specifically be an independent server or a server cluster composed of multiple independent servers. It can be understood by those skilled in the art that the system shown in FIG. 1 does not constitute a limitation on the system to which the present application scheme is applied, and a specific system may include more or less computer devices than shown in the figure, or have different computer device arrangements.

Specifically, after receiving an order, the server 140 assigns the order to the operating terminal 120 corresponding to each operating area according to a preset order assignment algorithm. Each order will include at least one material identification (Stock Keeping Unit, SKU). Take clothing as an example, one kind of clothing commodity with specification, color and style only corresponds to a SKU. It can be understood that each commodity in a warehouse has its corresponding SKU, through which this commodity can be uniquely determined.

The operating terminal 120 generates a material identification list of materials required by these orders according to the assigned orders. The material identification list includes a SKU list and number required for each SKU. Of course, the material identification list can also be generated on the server 140. In this way, the server 140 can query the material identification list, determine a fetching order according to a variety of priority strategies, and notify the warehouse robot 110 to fetch a material box according to the fetching order. Among them, the unprocessed orders include orders that are not assigned to an operating terminal, and the orders that have been assigned to the operating terminal but are not on an order wall. That is to say, orders that are not on the order wall are all unprocessed orders.

Before or after fetching the material, the warehouse robot 110 can acquire a material identification corresponding to the fetched material box. When the unprocessed order includes the material identification, and when it is determined that the material identified by the material identification has subsequent demand, the warehouse robot 110 queries whether there is an available temporary storage unit in the temporary storage shelf, and triggers a temporary storage instruction when there is an available temporary storage unit in the temporary storage shelf, and temporarily stores a material box or material corresponding to the material identification to the temporary storage shelf according to the temporary storage instruction, or instruct an operator to temporarily store the material box or material corresponding to the material identification to the temporary storage shelf through the temporary storage instruction. In this way, the warehouse robot 110 can be independently used to complete the material handling method.

Of course, the warehouse robot 110 can also send the material identification corresponding to the fetched material box to the operating terminal 120 (or the server 140) after fetching the material. In this way, the operating terminal 120 (or server 140) can query whether there is an available temporary storage unit in the temporary storage shelf when the unprocessed order includes the material identification, and when it is determined that the material identified by the material identification have subsequent demand, and send the temporary storage instruction when there is an available temporary storage unit in the temporary storage shelf, the warehouse robot 110 is instructed to temporarily store the material box or material corresponding to the material identification to the temporary storage shelf through the temporary storage instruction, or instruct the operator to temporarily store the material box or material corresponding to the material identification to the temporary storage shelf through the temporary storage instruction. In this way, the operating terminal 120 (or the server 140) can also be independently used to complete the material handling method.

Figure 2:
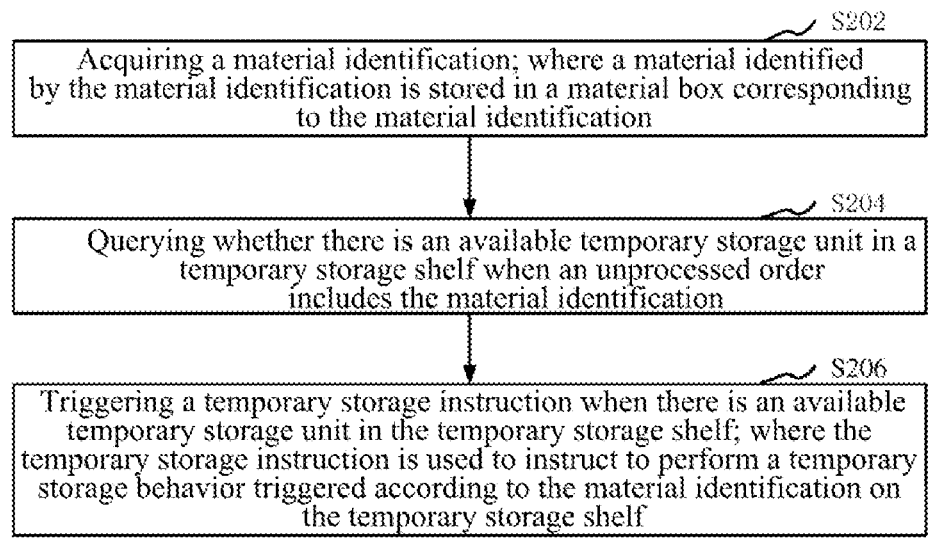
FIG. 2 is a flow diagram of a material handling method in an embodiment.

FIG. 2 is a flow diagram of a material handling method in an embodiment. The present embodiment mainly takes the material handling method applied to a computer device as example. The computer device can be the warehouse robot 110, the operating terminal 120 or the server 140 in FIG. 1. Referring to FIG. 2, the material handling method specifically includes the following steps:

S202, acquiring a material identification; where a material identified by the material identification is stored in a material box corresponding to the material identification.

Among them, the material identification (SKU) is used to uniquely identify one material, which can be a character string containing at least one character of a number, a letter and a symbol. The material box is a container for storing materials. In general, only one kind of SKU material is stored in one material box, and there are multiple material boxes storing materials with the same SKU. Of course, materials with multiple SKUs can also be stored in one material box. The material box is generally stored on a warehouse shelf. One warehouse shelf can store multiple material boxes.

A warehouse robot is a kind of mobile robot which is used to fetch the material box (material or inventory item) from the warehouse shelf to a material box storage unit of the warehouse robot, and then transfer it to an operating area. The operating area is an area for performing order processing. The number of operating areas is one or more. After a new order is added, a server can assign the order to the operating area for processing. Each warehouse robot can fetch the material for the orders processed in each operating area.

The operating area can store a temporary storage shelf and an order shelf. The temporary storage shelf is used for temporary storage of a material or a material box. In general, the material or the material in the material box stored on the temporary storage shelf is a material needed for a subsequent unprocessed order. The order shelf is used to store a material needed for a current processing order. Each order material storage unit in the order shelf is respectively used to store a material required by one order.

An operating terminal can also be stored in the operating area. The operating terminal in each operating area can record and manage information of the material or material box stored on the temporary storage shelf, including a material identification list. After the new order is added, the server can query the material identification list of each operating terminal, and combine a variety of factors to decide which operating terminal the order is assigned to. In general, when the order is assigned, priority will be given to assigning the order to an operating terminal of an operating area whose corresponding material identification list contains the most number of material identifications included in the order. In this way, it can avoid re-fetching the material box and improve handling efficiency. Among them, the operating terminal can be used to interact with the warehouse robot, instruct the warehouse robot to store the material or material box in the temporary storage shelf, and store the material in an order material storage unit corresponding to an order that needs the material. The operating terminal can also be used to instruct an operator to store the material or material box in the temporary storage shelf, and store the material in the order material storage unit corresponding to the order that needs the material.

In one embodiment, the warehouse robot includes multi-layer longitudinal arranged material box storage units and a movable handling assembly. Specifically, the warehouse robot can be a structure having two sides, in which one side is the multi-layer longitudinal arranged material box storage units, and the other side is the movable handling assembly. The handling assembly can be moved vertically, horizontally and rotated. The handling assembly is used to fetch the material box from the warehouse shelf and place it on the material box storage unit of the warehouse robot. Of course, when there are material boxes in the material box storage units of the warehouse robot, the warehouse robot can continue to place the material box on the handling assembly after fetching the material box through the handling assembly. That is to say, the material box fetched from the warehouse by the warehouse robot can be located on the material box storage unit of the warehouse robot or on the handling assembly of the warehouse robot. The handling assembly actually can also be considered as a material box storage unit.

Specifically, the number of layers of the material box storage unit of the warehouse robot is not necessarily the same as that of the warehouse shelf, and layer height is also not necessarily the same. When fetching the material, the warehouse robot can move the handling assembly longitudinally to a height position of the material box to be fetched on the warehouse shelf, move the material box to the handling assembly by moving the fetching arm of the handling assembly horizontally, and then rotate and/or move the handling assembly longitudinally to a height position of an available material box storage unit on the warehouse robot, and move the fetched material box to the material box storage unit of the warehouse robot through the fetching arm.

In a specific embodiment, the order shelf is also called a seeding wall (or order wall). Each unit in the seeding wall corresponds to one order. Seeding is a process of placing a material required by the order into a corresponding unit. Once all the required materials of the order are complete, the material in this unit can be moved out, and then a new order can be assigned to this unit.

Specifically, when the warehouse robot fetches the material box from the warehouse shelf, it can send a material identification corresponding to fetched material box to the operating terminal. A material identified by the material identification is stored in a material box corresponding to the material identification. When there is material with only one kinds of SKU in the material box, the material box only corresponds to the SKU. For example, a material identified by the material identification SKU1 is stored in a material box corresponding to SKU1. When the material box contains materials with multiple SKUs, the material box corresponds to these SKUs. For example, if the materials with SKU1 and materials with SKU2 are all stored in one material box, the material box corresponds to both SKU1 and SKU2.

In another embodiment, when there are multiple operating areas, and after the warehouse robot fetches the material box from the warehouse shelf, if the warehouse robot sends the material identification corresponding to the fetched material box to the server, an operating area identification corresponding to the operating area where the warehouse robot is located can be sent at the same time. In this way, the server can know which operating area the warehouse robot is involved in the order for fetching the material, and then view order data of the operating area and temporary storage data of the temporary storage shelf for subsequent operations.

In one embodiment, the warehouse robot sends a plurality of material identifications. The warehouse robot can also send the number of layers of the storage unit where each material box is located.

S204, querying whether there is an available temporary storage unit in a temporary storage shelf when an unprocessed order includes the material identification.

Among them, the unprocessed order includes orders that are not assigned to the operating terminal, and orders that have been assigned to the operating terminal but are not on the order wall. That is to say, the orders that are not on the order wall are all the unprocessed order. It can be understood that the order material storage units on the order shelves stored in each operating area are limited. The server will assign new orders to the operating area only when there is an available order material storage unit on the order shelf in the operating area. These orders are the current processing orders in the operating area, while the orders not assigned to the operating area are the unprocessed orders. In the embodiment of the present disclosure, the order includes a material identification of a required material and the number of the material identification. Of course, the order can also include order serial number, order barcode and other data.

Specifically, the operating terminal can query whether the material identification sent by the warehouse robot is a material identification included in the current processing order locally or through the server. If so, the warehouse robot will be informed to fetch the required number of materials by current processing order from the material box and store them in an order material storage unit of corresponding to the order that needs the materials; or inform the operator to fetch the required number of the materials by current processing order from the material box and store them in the order material storage unit corresponding to the order that needs the materials.

Of course, the warehouse robot itself can also query whether the material identification sent by the warehouse robot is the material identification included in the current processing order. If so, it controls the machine to fetch the required number of the materials by current processing order from the material box and store them in the order material storage unit corresponding to the order that needs the materials.

For example, order 1 corresponds to order material storage unit a, and needs to acquire three materials A; order 2 corresponds to order material storage unit b and needs to acquire one material A. The warehouse robot currently fetches a material box storing material A. The operating terminal instructs the warehouse robot or the operator to put three materials A into the order material storage unit a and one material A into the order material storage unit b.

Further, if the material identification sent by the warehouse robot is not the material identification included in the current processing order; or, after fetching the material from the material box according to the current processing order, the warehouse robot or operator can continue to query whether the material identification sent by the warehouse robot is the material identification included in the unprocessed order. If so, querying whether there is an available temporary storage unit in the temporary storage shelf; if not, informing the current or other warehouse robots to return the material box corresponding to the material identification, or move the material box to other console or transmission device.

It can be understood that the operating terminal can record a unit identification of the temporary storage unit where the material or material box is currently stored and a material identification corresponding to the material or material box stored on the temporary storage unit after controlling the warehouse robot to store the material or material box to the temporary storage shelf each time. The operating terminal can also delete a unit identification of the temporary storage unit and the corresponding recorded material identification after controlling the warehouse robot to fetch the material box or material from the temporary storage shelf each time. In this way, the operating terminal can know which temporary storage unit of the temporary storage shelf stores which kind of material, so as to query whether there is an available temporary storage unit when a material or material box needs to be stored in the temporary storage shelf.

In one embodiment, when the number of material identifications received by the operating terminal is multiple, the operating terminal can successively process from high to low according to the number of layers of storage units of material boxes where material boxes corresponding to the material identifications are located.

S206, triggering a temporary storage instruction when there is an available temporary storage unit in the temporary storage shelf; where the temporary storage instruction is used to instruct to perform a temporary storage behavior triggered according to the material identification on the temporary storage shelf.

Among them, the temporary storage instruction may be a computer program used to instruct a temporary storage. The temporary storage instruction can also be a visual notification used to instruct the temporary storage. The temporary storage behavior triggered according to the material identification being performed on the temporary storage shelf can be temporarily storing the material identified by the material identification to the temporary storage shelf, or temporarily storing the material box corresponding to the material identification to the temporary storage shelf.

Specifically, when the operating terminal or server queries that there is an available temporary storage unit in the temporary storage shelf, it will send a temporary storage instruction to the warehouse robot. The temporary storage instruction carries a path instructing the warehouse robot to go to the available temporary storage unit, and the warehouse robot can temporarily store the material identified by the material identification to the available temporary storage unit of the temporary storage shelf according to the path, it can also temporarily store the material box corresponding to the material identification to the available temporary storage unit of the temporary storage shelf.

Of course, the warehouse robot itself can also trigger the temporary storage instruction when it queries that there is an available temporary storage unit in the temporary storage shelf, and control the machine to temporarily store the material identified by the material identification to the available temporary storage unit of the temporary storage shelf, or temporarily store the material box corresponding to the material identification to the available temporary storage unit of the temporary storage shelf.

In another embodiment, when the operating terminal queries that there is an available temporary storage unit in the temporary storage shelf, it can also display a unit identification of the available unit on a display screen to inform the operator to temporarily store the material identified by the material identification to the available temporary storage unit of the temporary storage shelf, or temporarily store the material box corresponding to the material identification to the available temporary storage unit of the temporary storage shelf. When a material needs to be temporarily stored, the operating terminal can count the number of the materials needed in the unprocessed order and display the number on the display screen to prompt the operator to a temporary storage number.

The above material handling method automatically includes the material identification in the unprocessed order after acquiring the material identification, that is, querying whether there is an available temporary storage unit in the temporary storage shelf when subsequent order needs the material identified by the material identification, and triggering the temporary storage instruction when there is an available temporary storage unit in the temporary storage shelf, to instruct to temporarily store the material box corresponding to the material identification or the material identified by the material identification to the temporary storage shelf. In this way, the material is identified by the material identification, the material is stored by the material box, and a temporary storage shelf that can temporarily store the material box or the material is provided for temporarily storing a subsequent needed material or a material box that stores the material, so as to avoid time-consuming caused by frequent and repeated fetching and improve the efficiency of material handling.

In one embodiment, the material handling method further includes: when there is no available temporary storage unit in the temporary storage shelf, then querying a respective corresponding comprehensive priority of each material box temporarily stored in the temporary storage shelf; and triggering a first removal instruction; the first removal instruction is used to instruct to remove a material box corresponding to a lowest comprehensive priority.

Specifically, when the operating terminal or server queries that there is no available temporary storage unit in the temporary storage shelf, it queries the respective corresponding comprehensive priority of each material box temporarily stored in the temporary storage shelf. The comprehensive priority is positively related to the number of times that a corresponding material box is demanded. The number of times of demands of the material box indicates the number of unprocessed orders that require all SKUs contained in the material box.

When there is only one kinds of SKU included in the material box, the comprehensive priority of the material box is positively related to the number of unprocessed orders that demand the SKU; when multiple SKUs are included in the material box, the comprehensive priority of the material box is positively related to the number of unprocessed orders that demand these SKUs. In other words, the larger the number of unprocessed orders of SKUs in the demand material box is, the higher the comprehensive priority corresponding to the material box is, and the operating terminal or server can trigger the first removal instruction for instructing to remove the material box corresponding to the lowest comprehensive priority.

Further, the operating terminal or server can instruct the warehouse robot that fetches the material or other robots to remove the material box corresponding to the lowest comprehensive priority through the first removal instruction.

In one embodiment, the material handling method further includes: moving the material box corresponding to the lowest comprehensive priority to a transmission device according to the first removal instruction; and the transmission device is configured to transfer the material box from a current operating area to other operating area. For example, moving the material box corresponding to the minimum number of times of demands to the transmission device according to the first removal instruction.

Among them, the transmission device can be a transfer belt or other robots. Specifically, the warehouse robot that fetches the material and other warehouse robots can move the material box corresponding to the lowest comprehensive priority to the transmission device according to the first removal instruction. The transmission device herein is used to transfer the material box from the current operating area to other operating area. It can be understood that different operating areas can be equipped with transmission devices, and each operating area can transfer the removed material box to the operating area that needs the material box through the transmission device.

In one embodiment, before querying whether there is an available temporary storage unit in the temporary storage shelf, it further includes: detecting whether the material box arrives at a current operating area in advance according to arrival time and/or arrival sequence of the material box; and executing the querying whether there is an available temporary storage unit in the temporary storage shelf when the material box arrives at the current operating area in advance.

Optionally, the operating terminal or server can plan time and/or sequence of the arrival sequence of the material box corresponding to each material identification according to overall situation of the unprocessed orders assigned in each operating area, as well as one or more factors such as a site map, location of the material box to be handled, location of the warehouse robot, etc., and set a preset arrival time and/or a preset arrival sequence of the material box corresponding to each material identification. Among them, the preset arrival time and/or preset arrival sequence can be updated in real time according to one or more of the above factors, and the arrival time can be a specific certain time or a certain time period.

The operating terminal, server or warehouse robot can record the arrival time and/or arrival sequence of each material box arriving at a corresponding assigned operating area (i.e., the current operating area), and compare the arrival time with the preset arrival time and/or arrival sequence with the preset arrival sequence. When the arrival time is less than the preset arrival time (i.e., time advance) and/or the arrival sequence is less than the preset arrival sequence (i.e., sequence advance), it is determined that the material arrive at the current operating area in advance. At this time, it can query whether there is an available temporary storage unit in the temporary storage shelf.

In one embodiment, when it is determined that the material box does not arrive at the current operating area in advance (i.e., arrive on time and/or in sequence, or overtime/out of sequence), fetching material and assigning orders can be performed directly according to the material box, without temporarily storing the material box, so as to improve handling efficiency of the material box that does not arrive at the current operating area in advance.

Figure 3:
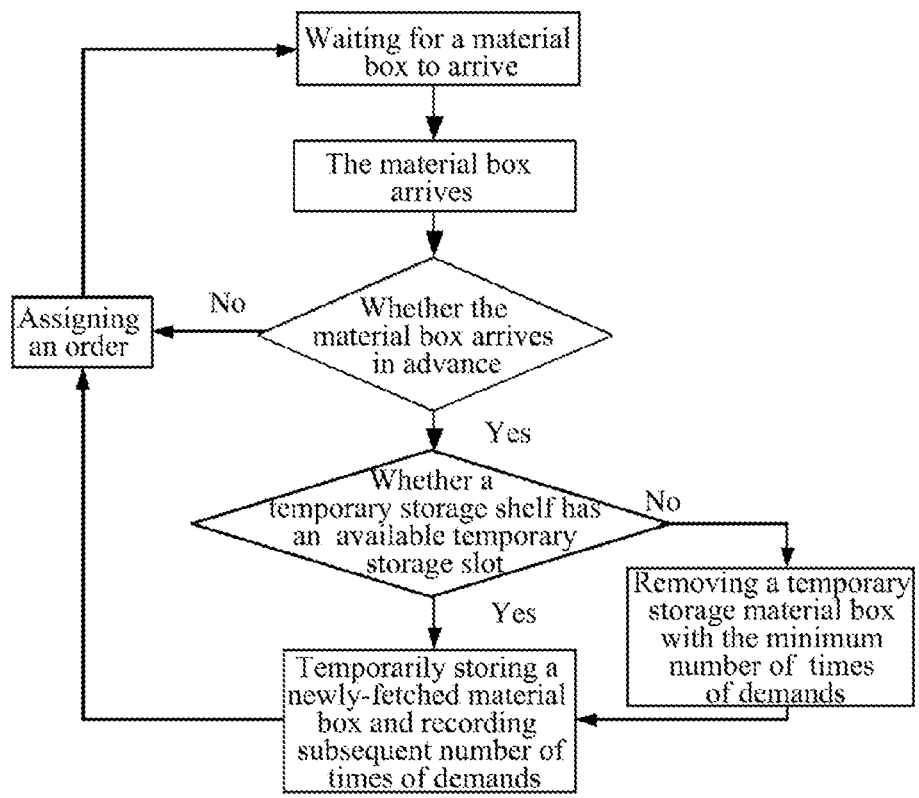
FIG. 3 is a logic diagram of material handling in an embodiment.

FIG. 3 shows a logic diagram of material handling in one embodiment. Referring to FIG. 3, an operating terminal is waiting for a warehouse robot to fetch a material (i.e., waiting for a material box to arrive). When the warehouse robot arrives at an operating area (i.e., the material box arrives), it sends a material identification to the operating terminal. The operating terminal queries whether an unprocessed order includes the material identification; when the unprocessed order includes the material identification, it detects whether the material box arrive at a current operating area in advance according to arrival time and/or arrival sequence of the material box (i.e., whether the material box arrives in advance); when the material box arrives at the current operating area in advance (the material box arrives in advance), it queries whether a temporary storage shelf has an available temporary storage unit; if so (there is an available temporary storage unit), the material box will be temporarily stored and subsequent number of times of demands will be recorded, and the material will be fetched and the order will be assigned according to a current processing order; if not (there is no available temporary storage unit), the temporary storage material box with the minimum number of times of demands will be removed, and then a newly-fetched material box will be temporarily stored and the subsequent number of times of demands will be recorded, and the material will be fetched and the order will be assigned according to the current processing order. If the unprocessed order does not include the identification of the material (the material box does not arrive in advance), the material box will be returned after fetching material and assigning order according to the current processing order. The operating terminal can wait for the warehouse robot to fetch the material again until all the orders are completed.

In the present embodiment, when there is no available temporary storage unit to store the newly-fetched material box, the temporary storage material box with the lowest comprehensive priority, that is, the minimum number of times of subsequent demands, is removed to temporarily store the new material box, which can avoid an occurrence of material box re-fetching as much as possible and improve material handling efficiency.

In one embodiment, when only one SKU is stored in one material box, the operating terminal or server can count the number of unprocessed orders including a material identification after receiving the material identification, that is, the number of times that a material box corresponding to the material identification is demanded. In this way, when the operating terminal or server queries that there is no available temporary storage unit in the temporary storage shelf, it can query the number of unprocessed orders including the material identification for each material identification in a material identification list corresponding to the temporary storage shelf, so as to obtain the respective corresponding number of times that each material box temporarily stored in the temporary storage shelf is demanded. Comparing the number of times that the current fetched material box is demanded with the number of times that the material boxes on the temporary storage shelf are demanded, and removing the material box whose the number of times is less than the number of times that the current fetched material box is demanded to free up the temporary storage unit to temporarily store the current fetched material box.

In the present embodiment, when there is no available temporary storage unit to store the newly-fetched material box, the temporary storage material box that has fewer subsequent number of times of demands than the current material box is removed to temporarily store the new material box, which can reduce the number of times of material box re-fetching as much as possible and improve material handling efficiency.

In one embodiment, the material handling method further includes: determining the number of the unprocessed orders including the material identification; continuing to execute the querying whether there is an available temporary storage unit in the temporary storage shelf when the determined number exceeds a preset number; and triggering a fetching instruction when the determined number does not exceed the preset number, where the fetching instruction is used to instruct to fetch a material corresponding to a material identification required by a current processing order from the material box.

Among them, the preset number is a preset number constraint condition of temporarily storing the material box. When the number of times that material box is required exceeds the preset number, it is determined that the material box can be temporarily stored.

Specifically, after receiving the material identification, the operating terminal or server can count the number of unprocessed orders including the material identification, that is, the number of times that the material box corresponding to the material identification is demanded. Comparing the counted number with the preset number, when the counted number exceeds the preset number, it is determined that the material box can be temporarily stored and temporary storage operation is continued; when the counted number does not exceed the preset number, it is determined that the material box does not need to be temporarily stored and the fetching instruction is triggered. The fetching instruction is used to instruct to fetch the material corresponding to the material identification required by the current processing order from the material box. Among them, the fetching operation can be carried out by the warehouse robot that fetches the material, robots of other area and an operator.

Figure 4:
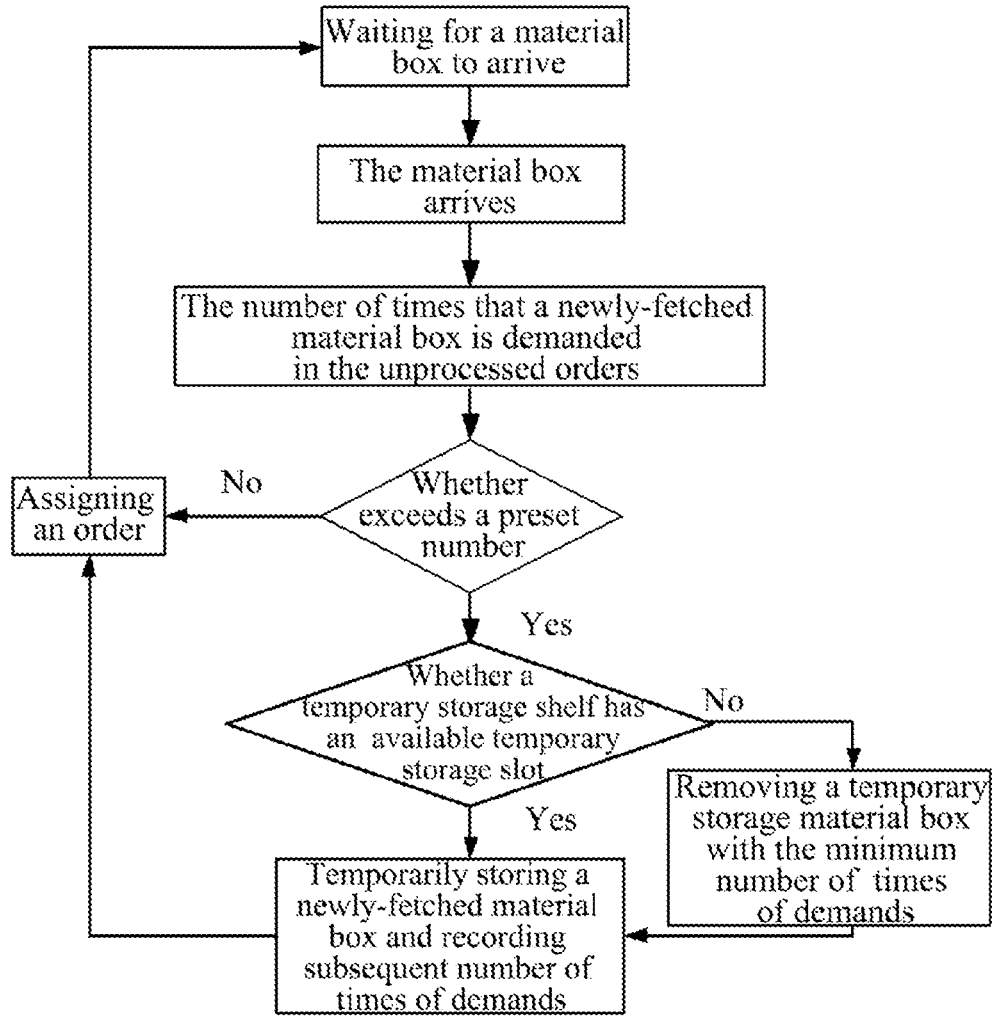
FIG. 4 is a logic diagram of material handling in another embodiment.

FIG. 4 shows a logic diagram of material handling in one embodiment. Referring to FIG. 4, an operating terminal is waiting for a warehouse robot to fetch a material (i.e., waiting for a material box to arrive). When the warehouse robot arrives at an operating area (i.e., the material box arrives), it sends a material identification to the operating terminal. The operating terminal counts the number of unprocessed orders including the material identification (i.e., the number of times that a newly-fetched box is demanded in the unprocessed orders); and determines whether a counted number exceeds a preset number. If the counted number exceeds the preset number (that is, the material box can be temporarily stored), querying whether there is an available temporary storage unit in a temporary storage shelf; if so (there is an available temporary storage unit), the material box will be temporarily stored and subsequent number of times of demands will be recorded, and the material will be fetched and the order will be assigned according to a current processing order; if not (there is no available temporary storage unit), the temporary storage material box with the minimum number of times of demands will be removed, and then the material box will be temporarily stored and the subsequent number of times of demands will be recorded, and the material will be fetched and the order will be assigned according to the current processing order. If the counted number does not exceed the preset number (i.e., the material box does not need to be temporarily stored), the material will be fetched and the order will be assigned according to the current processing order. The operating terminal can wait for the warehouse robot again to fetch the material until all the orders are completed.

In the present embodiment, the newly-fetched material box is temporarily stored only after the subsequent number of times of demands exceeds a preset number of times. A limited number of temporary storage units can be reasonably used to avoid temporarily storing a large number of materials that a small number of times are demanded, which leads to no temporary storage units available for material with more demands.

In one embodiment, the material box is located on a material box storage unit of the warehouse robot; the warehouse robot includes multi-layer longitudinal arranged material box storage units; the material handling method also includes the following steps: determining the number of layers of the material box storage unit where the material box is located; the number of layers of the material box storage unit is positively related to a height of the material box storage unit from a ground; continuing to execute the querying whether there is an available temporary storage unit in the temporary storage shelf when the determined number of layers reaches a preset number of layers, and triggering a fetching instruction when the determined number of layers does not reach the preset number of layers, where the fetching instruction is used to instruct to fetch a material corresponding to a material identification required by a current processing order from the material box.

Among them, the preset number of layers is a preset number constraint condition of the location for temporarily storing the material box. When the number of layers of the material box storage unit where the material box is located reaches the preset number of layers, it is determined that the material box can be temporarily stored. The number of layers of the material box storage unit is positively related to the height of the material box storage unit from the ground, that is, the higher the number of layers of the material box storage unit is, the higher the height of the material box storage unit from the ground is. The preset number of layers is, for example a fourth layer, etc.

Specifically, after receiving the material identification, the operating terminal or server can determine the number of layers of the material box storage unit corresponding to the material identification. Comparing the determined number of layers with the preset number of layers, when the determined number of layers reaches the preset number of layers, it is determined that the material box can be temporarily stored and temporary storage operation is continued; when the determined number of layers does not reach the preset number of layers, it is determined that the material box does not need to be temporarily stored and the fetching instruction is triggered. The fetching instruction is used to instruct to fetch the material corresponding to the material identification required by the current processing order from the material box. Among them, the fetching operation can be carried out by the warehouse robot that fetches the material, robots of other areas and an operator.

In the present embodiment, due to the higher the number of layers of the material box is, the more difficult and time-consuming for fetching and storing are, in this way, a newly-fetched material box will be temporarily stored when the number of layers where the newly-fetched material box is located reaches the preset number of layers, which can avoid re-fetching a high layer material box, so as to further improve the material handling efficiency.

In a specific embodiment, when only one SKU is stored in one material box, the operating terminal or server may prioritize determining the number of layers of the material box storage unit where the material box is located after receiving the material identification. When the determined number of layers reaches the preset number of layers, it is determined to temporarily store the material box corresponding to the material identification. When the determined number of layers does not reach the preset number of layers, it will query whether an unprocessed order includes the material identification. If the unprocessed order does not include the material identification, it is determined that there is no need to temporarily store the material box corresponding to the material identification. If the unprocessed order includes the material identification, the number of unprocessed orders including the material identification is determined, and the number of times that the material identified by the material identification is demanded is obtained. When the determined number does not exceed the preset number, it is determined that there is no need to temporarily store the material box corresponding to the material identification. When the determined number exceeds the preset number, it is determined to temporarily store the material box corresponding to the material identification.

After determining the material box corresponding to the material identification, querying whether there is an available temporary storage unit in the temporary storage shelf. If it is queried that there is an available temporary storage unit in the temporary storage shelf, then it will be temporarily stored directly. If it is queried that there is no available temporary storage unit in the temporary storage shelf, then in the case for a layer height to determine the temporary storage, querying a respective corresponding number of times that each material box temporarily stored in the temporary storage shelf is demanded, and removing a material box corresponding to the minimum number of times of demands to temporarily store a new material box, or in the case for a high number of times of demands to determine the temporarily store, removing the material box whose number of times of demands is less than that of the new material box to temporarily store the new material box. If the respective corresponding number of times that each material box temporarily stored in the temporary storage shelf is demanded is all greater than the number of times that the new material box is demanded, the new material box is not temporarily stored.

In one embodiment, the temporary storage unit includes a material box temporary storage unit and a material temporary storage unit, and the temporary storage instruction includes a material box temporary storage instruction and a material temporary storage instruction; the triggering a temporary storage instruction when there is an available temporary storage unit in the temporary storage shelf includes: triggering the material box temporary storage instruction when there is an available material box temporary storage unit in the temporary storage shelf; the material box temporary storage instruction is used to instruct to temporarily store a material box corresponding to the material identification in the temporary storage shelf; and/or triggering the material temporary storage instruction when there is an available material temporary storage unit in the temporary storage shelf; the material temporary storage instruction is used to instruct to temporarily store a material corresponding to the material identification in the temporary storage shelf.

Specifically, the material box temporary storage unit is the unit used to store the material box. The material temporary storage unit is the unit used to store the material. In other words, the temporary storage shelf can be a shelf for temporarily storing the material box or a shelf for temporarily storing the material. In the embodiment of the present disclosure, temporarily storing the material box through the temporary storage shelf can reduce a re-fetching ratio for the material box and improve the material handling efficiency. Temporarily storing the material box is essentially also temporarily storing the material, but time cost and space cost for temporarily storing the material box are relatively high. Therefore, in the embodiment of the present disclosure, the material itself can also be directly temporarily stored without temporarily storing the material box. When the temporary storage shelf is used to temporarily store the material, the volume of each temporary storage unit can be reduced to temporarily store more kinds of materials. When an operator in the operating area fetches the material from the material box on the body of the warehouse robot, if a system finds that it is necessary to temporarily store the material, the system will remind the operator to additionally fetch a certain number of materials and put them into a unit designated by the temporary storage shelf. When the material needs to be used subsequently, a certain number of materials can be directly taken out from the designated unit of the temporary storage shelf.

Among them, the material box re-fetching means that the warehouse robot returns the material box after handling a certain material box to the operating area for order delivery, and if there are subsequent orders that require the material stored in the material box, the warehouse robot needs to handle the material box again. Obviously, the operating efficiency of the system will be reduced by the material box re-fetching.

In the present embodiment, by temporarily storing the material box or material through the temporary storage shelf, the re-fetching ratio of the material box can be reduced and the material handling efficiency can be improved. Moreover, when temporarily storing the material, a volume of the temporary storage unit can be reduced to temporarily store more kinds of material, which can further improve the efficiency of material handling.

In one embodiment, the triggering the material temporary storage instruction when there is an available material temporary storage unit in the temporary storage shelf includes: querying the number of materials identified by the material identification which required by the unprocessed order when there is an available material temporary storage unit in the temporary storage shelf, and triggering a material temporary storage instruction corresponding to the number; the material temporary storage instruction is used to instruct to temporarily store the materials corresponding to the number to a designated material temporary storage unit in the temporary storage shelf.

Specifically, when the operating terminal or server determines that there is an available material temporary storage unit in the temporary storage shelf, it can count a received number of materials identified by the material identification required by the unprocessed order, send the material temporary storage instruction corresponding to the number to the warehouse robot, and the warehouse robot temporarily stores the materials corresponding to the number to the designated material temporary storage unit in the temporary storage shelf. The operating terminal can also inform the operator to temporarily store the materials corresponding to the number to the designated material temporary storage unit in the temporary storage shelf.

Of course, when the warehouse robot itself determines that there is an available material temporary storage unit in the temporary storage shelf, it can also count the received number of materials identified by the material identification required by the unprocessed order, trigger the material temporary storage instruction, and control a machine to temporarily store the materials corresponding to the number to the designated material temporary storage unit in the temporary storage shelf.

For example, if the operator terminal receives a material identification as SKU1 and the unprocessed orders include SKU1, it will temporarily store, and a temporary storage number is equal to the demand number of these unprocessed orders. For example, if two pieces of SKU 1 are required on a seeding wall and five pieces of SKU 1 are required in the unprocessed orders, a total of seven pieces will be fetched, the operators will directly put two pieces on the seeding wall, and will put five pieces into the designated temporary storage unit for subsequent use.

Figure 5:
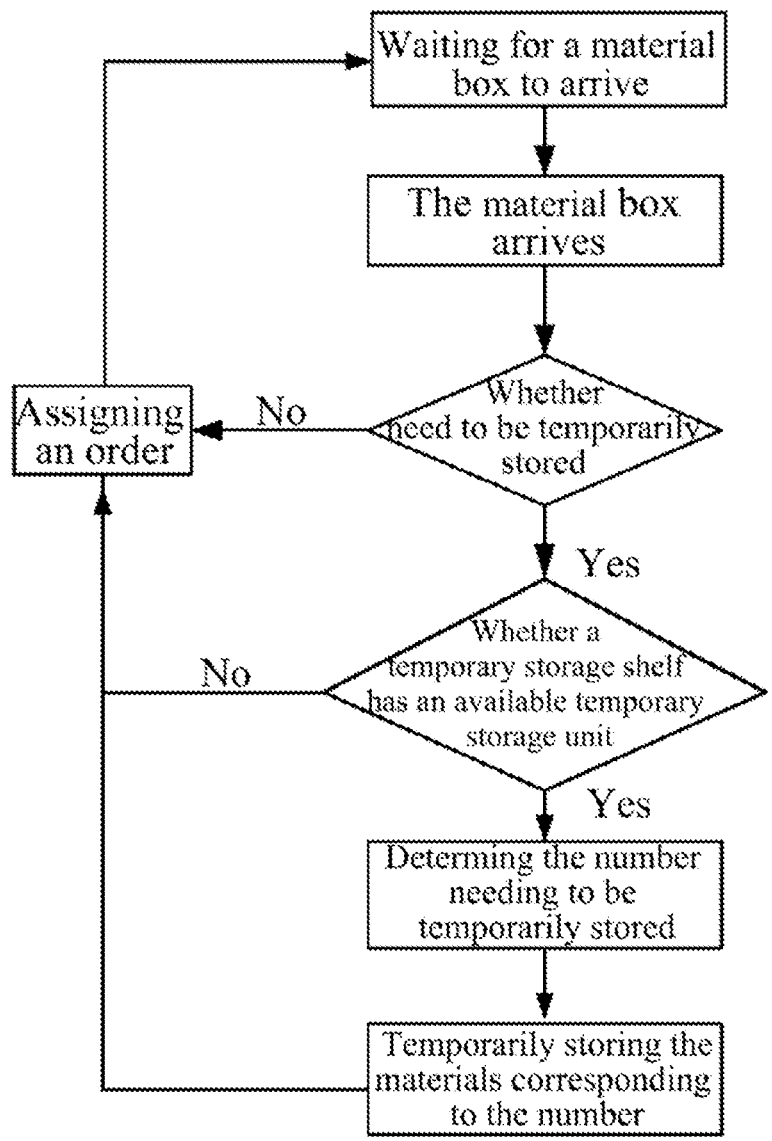
FIG. 5 is a logic diagram of material handling in another embodiment.

FIG. 5 shows a logic diagram of material handling in one embodiment. Referring to FIG. 5, an operating terminal is waiting for a warehouse robot to fetch a material (i.e., waiting for a material box to arrive). When the warehouse robot arrives at an operating area (i.e., the material box arrives), it sends a material identification to the operating terminal. The operating terminal checks whether an unprocessed order contains the material identification (i.e., whether the material needs to be temporarily stored); if the unprocessed order contains the material identification (that is, the material needs to be temporarily stored), querying whether there is an available material temporary storage unit in the temporary storage shelf; if so (there is an available temporary storage unit), determining the number to be temporarily stored and temporarily store the materials corresponding to the number. If not (there is no available temporary storage unit), the material box will be returned after fetching material and assigning order according to the current processing order. If the unprocessed order does not contain the material identification (i.e., the material do not need to be temporarily stored), the material box will be returned after fetching material and assigning order according to the current processing order. The operating terminal can wait for the warehouse robot to fetch the material again until all the orders are completed.

In the present embodiment, the material is temporarily stored on the temporary storage shelf according to the data of the demanded material in subsequent unprocessed orders, which further improves the efficiency of material handling and the efficiency of order processing.

In one embodiment, when the warehouse robot includes multi-layer longitudinal arranged material box storage units, the warehouse robot is relatively high. If the material box is stored in the material box storage unit on an upper layer of the warehouse robot, it is difficult for an operator to fetch the material in the material box directly. At this time, the operating terminal can control the warehouse robot to take down a material box reaching to a preset number of layers and store it on the material box temporary storage unit of the temporary storage shelf. The material box that does not reach the preset number of layers is not temporarily stored, and the operator will be informed to directly take down the material from the material box and put it into the material temporary storage unit of the temporary storage shelf.

In addition, the operating terminal can also control the warehouse robot to move the material boxes reaching the preset number of layers to a handling assembly. After the handling assembly is moved longitudinally to a height that the operator can operate, the operator is informed to fetch the material in the material box on the handling assembly and put it into the material temporary storage unit of the temporary storage shelf or an order material storage unit on an order shelf. After the fetching the material boxes on the handling assembly is completed, the warehouse robot returns the material boxes to an original located material box temporary storage unit of the warehouse robot for storage, then takes the material box that does not reach the preset number of layers to the handling assembly for the operator to fetch. In order to improve the efficiency, when the warehouse robot returns an upper layer material box, the operator can fetch a material in a lower layer material box and put it into the material temporary storage unit of the temporary storage shelf, or the order material storage unit on the order shelf.

It can be understood that in the above embodiment, the material box is temporarily stored because the material stored in the material box is needed for the unprocessed order, but it does not mean that the material stored in the material box is not needed for a current processing order. The operating terminal can continue to control the warehouse robot or operator to fetch the material from the temporarily stored material boxes to the order material storage unit of the order shelf to complete the order delivery after controlling the warehouse robot to temporarily store the material box in the temporary storage shelf. For example, if an order on a current seeding wall needs three pieces of a certain SKU and the unprocessed order needs two pieces of this SKU, then the material box of this SKU can be temporarily stored, and then three pieces are taken out of the material box and put them in the corresponding unit of the seeding wall. After the unprocessed order requiring this SKU is assigned to the seeding wall, two pieces are taken out from the temporarily store material box and put them into the corresponding seeding wall unit. Of course, when the material box is not temporarily stored, the current processing order may also require the material stored in the material box. Therefore, when the material box is not temporarily stored, after the operating terminal will fetch the material required by the current processing order from the material box, it informs the warehouse robot to return the material box.

In the embodiment of the present disclosure, the minimum unit for the warehouse robot to handle is a material box rather than a shelf, that is, the warehouse robot can handle multiple material boxes to the operating area at one time. Compared with handing a whole shelf, the volume of a single material box is relatively smaller and more flexible. Moreover, each operating area is equipped with a temporary storage shelf, which allows the warehouse robot to temporarily store the material boxes on the temporary storage shelf for temporarily storing.

In one embodiment, the temporary storage shelf may be equipped with a prompt light and/or a display apparatus. Specifically, each temporary storage unit can be configured with a prompt light and/or display apparatus. In this way, after the material box is stored in the temporary storage shelf, the operator can be prompted the number of material needing to be taken to the order shelf through the prompt light and/or display apparatus configured in the unit where the box is located. For example, the color of the prompt light indicates the number of materials. Red represents one piece, yellow represents two pieces, etc. Another example is to display the number of materials through the display apparatus. The order shelf can also be equipped with a prompt light and/or display apparatus (In a same order, the prompt light and/or display apparatus on the temporary storage shelf and the order shelf prompt same information, for example, the prompt light displays a same color to prevent the operator from misoperation). When all the materials needed in one order on the order shelf is put in, the server or operating terminal can prompt to package and send the order.

In one embodiment, the material handling method further includes: querying a respective corresponding material identification of each material box temporarily stored in a temporary storage shelf of each operating area; determining a temporary storage shelf where a material box corresponding to a material identification included in a newly added order is located; and assigning the newly added order to an operating terminal of the operating area where the determined temporary storage shelf is located.

Specifically, when a new order arrives at the server, the server can query the respective corresponding material identification of each material box temporarily stored in the temporary storage shelf of each temporary storage operating area, and specifically can query a material identification list of the temporary storage shelf of each temporarily store operating area. Determining the temporary storage shelf where the material box corresponding to the material identification included in the newly added order is located, and assigning the newly added order to the operating terminal of the operating area where the determined temporary storage shelf is located. That is to say, when the material demanded by the newly added order is temporarily stored on the temporary storage shelf of which operating area, the newly added order will be assigned to the operating terminal of this operating area so as to perform order processing in this operating area.

If the material demanded by the newly added order is temporarily stored on multiple temporarily storing shelves, the number of the types of material demanded by the newly added order temporarily stored on the multiple temporarily storing shelves can be counted respectively. The newly added order is assigned to the operating terminal of the operating area where the temporary storage shelf temporarily storing materials with a largest number of the types demanded by the newly added order is located, so as to avoid material box re-fetching as much as possible and improve the efficiency of material handling.

Figure 6:
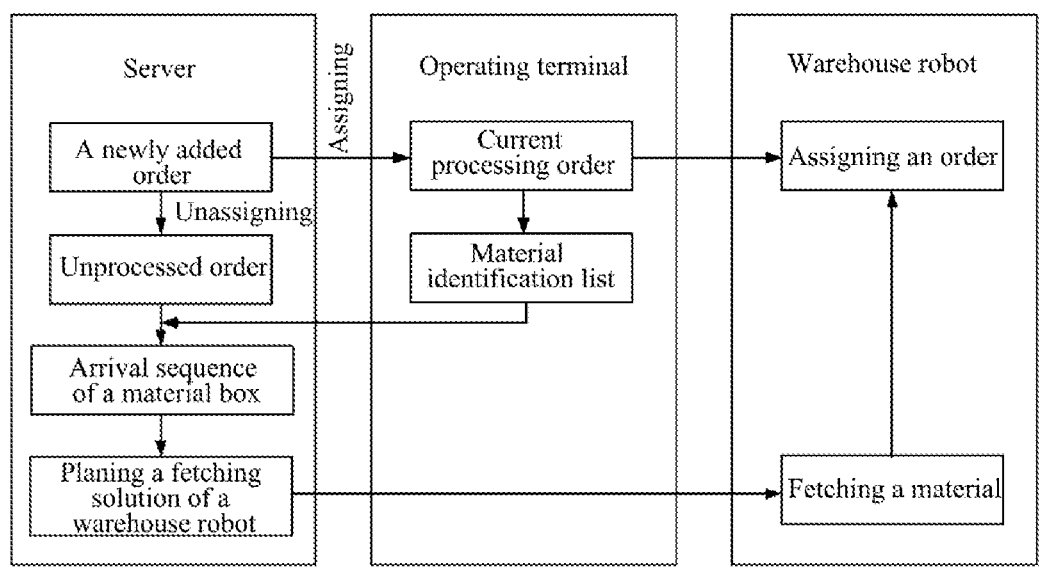
FIG. 6 is a logic diagram of order processing in an embodiment.

FIG. 6 shows a logic diagram of order processing in one embodiment. Referring to FIG. 6, a server can assign an order to an operating terminal in an operating area after newly adding an order. The operating terminal obtains a current processing order and determines a material identification list of a required material according to the current processing order, so that the server can determine an arrival sequence of a material box according to an unprocessed order and the material identification list, and plan a fetching solution of the warehouse robot according to the arrival sequence of the material box, and inform the warehouse robot to fetch the material. After the warehouse robot takes the material box to the operating area, the warehouse robot or operator will assign the order according to the current processing order. The operating terminal in the operating area can temporarily store a taken material box according to the above embodiment.

It can be understood that due to a limited number of order material storage units on an order shelf, each operating area can process only a limited number of orders at the same time. In this case, the problem of material box re-fetching often occurs. Material box re-fetching refers to that the warehouse robot returns the material box after handling a material box to the operating area to meet the demand of a certain order, and then there is an order that needs a material stored in the material box, so the warehouse robot needs to handle the material box again. Material box re-fetching will reduce operating efficiency of a system. In order to avoid an occurrence of material box re-fetching as much as possible, an arrival sequence of a material box can be determined to minimize a ratio of material box re-fetching. However, due to various factors in practice, the material box cannot arrive at the operating area according to a preset material arrival sequence. At this time, the temporary storage shelf can be used to temporarily store the material box that arrives in advance, so that subsequent orders that need to temporarily store a material temporarily stored in the material box can be directly fetched and assigned the order from the temporary storage shelf. In addition, using the temporary storage shelf can also optimize an order assignment process, which can prioritize to assign an order with required material on the temporary storage shelf to an operating area where the temporary storage shelf is located for processing.

The arrival sequence of a material box can be determined by the number of orders that material need to be stored in the material box in the unprocessed order. When there are more materials needing to be stored in the material box in the unprocessed order, the arrival sequence of the material box is later. That is to say, it is better to arrive at the operating area after assigning all these unprocessed orders that need to store material in the material box to the order shelf, so as to avoid an occurrence of re-fetching the material box.

In the present embodiment, the order is assigned according to temporary storage condition of the material boxes on the temporary storage shelf of each operating area, so as to avoid material box re-fetching as much as possible and improve the material handling efficiency.

In one embodiment, the above method also includes: querying whether a material identification of a material on the temporary storage shelf is not included in any current unprocessed order; and triggering a second removal instruction when it is queried that there is a material identification that is not included in any current unprocessed order; the second removal instruction is used to instruct to remove a corresponding material box identified by the material identification that is not included in any current unprocessed order.

Specifically, the operating terminal or server can perform an occupancy query to the material box on the temporary storage shelf to detect whether the material box on the temporary storage shelf is not needed by any unprocessed order. A frequency of the query can be based on working time of fetching handling. Every time a preset time is reached, a query will be initiated. The initiated query can be used to query all or part of the material boxes on the temporary storage shelf, and the part of the material boxes can be specified material boxes or randomly selected material boxes.

In one embodiment, or when it is detected that an occupancy time of a certain material box on the temporary storage shelf exceeds the preset time, the occupancy query can be performed separately for the material box to detect whether all the materials in the material box are no longer needed by any unprocessed order.

When it is determined that all the materials in the material box are not needed by any unprocessed order, it means that the mishandling to the material box may be occurred, or the situation for cancelling a certain order may be occurred, so that a temporary storage unit is always occupied by a material box storing corresponding material. Therefore, when it is queried that there is a material identification which is not included in any current unprocessed order, triggering the second removal instruction; the second removal instruction is used to instruct to remove a corresponding material box identified by the material identification that is not included in any current unprocessed order, so as to release the material box from occupying the temporary storage unit.

Among them, the material temporarily stored on the temporary storage shelf will not be put back into the material box under normal circumstances. However, in a case of order cancellation, it may result that a certain temporary storage unit may be occupied by a certain material all the time. Therefore, the material that is not required by the order should be checked regularly and then put it back into the material box. In addition, due to a limited space of the temporary storage unit, there is a limit to the number of materials to be temporarily stored in each unit. If the number of materials needing to be temporarily stored is greater than the limited number of unit temporarily storing, multiple units can be occupied to temporarily store a same kind of materials.

It should be understood that although the various steps in the flowchart of the above embodiments are shown in sequence indicated by the arrows, these steps are not necessarily performed in sequence indicated by the arrows. Unless otherwise specified in this description, there is no strict sequence restriction on the execution of these steps. These steps can be executed in other sequences. Moreover, at least part of the steps in the above various embodiments may include a plurality of sub-steps or a plurality of stages. These sub-steps or stages may not be necessarily executed at the same time, but may be executed at different times, and an execution sequence of these sub-steps or stages is not necessarily sequential, but may be executed alternately and commutatively with other steps or at least part of the sub-steps or stages of other steps.

Figure 7:
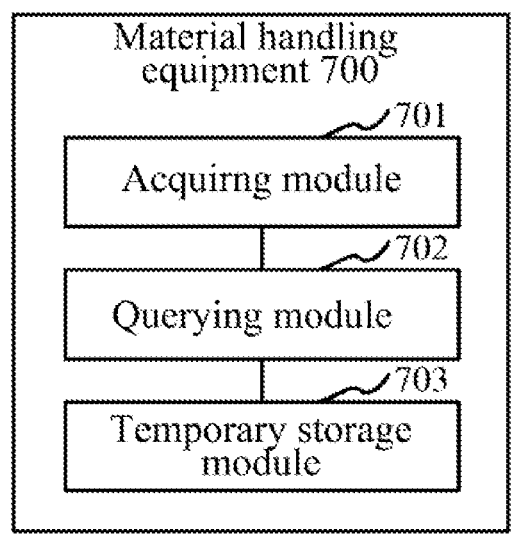
FIG. 7 is a block structure diagram of a material handling equipment in an embodiment.

As shown in FIG. 7, in one embodiment, a material handling equipment 700 is provided. Referring to FIG. 7, the material handling equipment 700 includes an acquiring module 701, a querying module 702, and a temporary storage module 703. The various modules included in the material handling equipment 700 may be implemented in whole or in part by software, hardware or a combination thereof.

The acquiring module 701 is configured to acquire a material identification; a material identified by the material identification is stored in a material box corresponding to the material identification.

The querying module 702 is configured to query whether there is an available temporary storage unit in a temporary storage shelf when an unprocessed order includes the material identification.

The temporary storage module 703 is configured to trigger a temporary storage instruction when there is an available temporary storage unit in the temporary storage shelf; the temporary storage instruction is used to instruct to perform a temporary storage behavior triggered according to the material identification on the temporary storage shelf.

In one embodiment, the temporary storage module 703 is further configured to query a respective corresponding comprehensive priority of each material box temporarily stored in the temporary storage shelf when there is no available temporary storage unit in the temporary storage shelf; and trigger a first removal instruction; the first removal instruction is used to instruct to remove a material box corresponding to a lowest comprehensive priority.

In one embodiment, the temporary storage module 703 is further configured to move the material box corresponding to the lowest comprehensive priority to a transmission device according to the first removal instruction; and the transmission device is configured to transfer the material box from a current operating area to other operating area.

In one embodiment, the comprehensive priority is positively related to the number of times that a corresponding material box is demanded, and the temporary storage module 703 is further configured to move the material box corresponding to the minimum number of times of demands to the transmission device.

In one embodiment, detect whether the material box arrives at a current operating area in advance according to arrival time and/or arrival sequence of the material box, and query whether there is an available temporary storage unit in the temporary storage shelf when the material box arrives at the current operating area in advance.

In one embodiment, the querying module 702 is further configured to determine the number of the unprocessed orders including the material identification; continue to execute the querying whether there is an available temporary storage unit in the temporary storage shelf when the determined number exceeds a preset number; and trigger a fetching instruction when the determined number does not exceed the preset number, where the fetching instruction is used to instruct to fetch a material corresponding to a material identification required by a current processing order from the material box.

In one embodiment, the material box is located on a material box storage unit of a warehouse robot; and the warehouse robot includes multi-layer longitudinal arranged material box storage units. The querying module 702 is further configured to determine the number of layers of the material box storage unit where the material box is located; the number of layers of the material box storage unit is positively related to a height of the material box storage unit from a ground; continue to execute the querying whether there is an available temporary storage unit in the temporary storage shelf when the determined number of layers reaches a preset number of layers, and trigger a fetching instruction when the determined number of layers does not reach the preset number of layers, where the fetching instruction is used to instruct to fetch a material corresponding to a material identification required by a current processing order from the material box.

In one embodiment, the temporary storage module 703 is further configured to trigger the material box temporary storage instruction when there is an available material box temporary storage unit in the temporary storage shelf; the material box temporary storage instruction is used to instruct to temporarily store a material box corresponding to the material identification in the temporary storage shelf; and/or trigger the material temporary storage instruction when there is an available material temporary storage unit in the temporary storage shelf; the material temporary storage instruction is used to instruct to temporarily store a material identified by the material identification in the temporary storage shelf.

In one embodiment, the temporary storage module 703 is further configured to query the number of materials identified by the material identification which required by the unprocessed order when there is an available material temporary storage unit in the temporary storage shelf; and trigger a material temporary storage instruction corresponding to the number; the material temporary storage instruction is used to instruct to temporarily store the material corresponding to the number to a designated material temporary storage unit in the temporary storage shelf.

Figure 8:
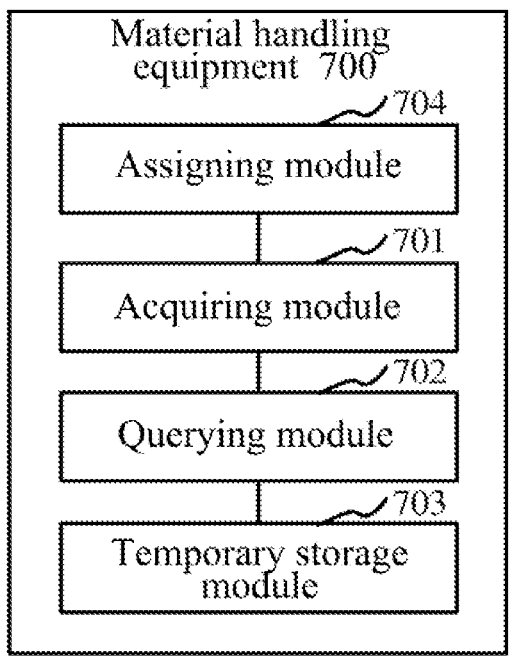
FIG. 8 is a block structure diagram of a material handling equipment in another embodiment.

As shown in FIG. 8, in one embodiment, the material handling equipment 700 further includes: an assigning module 704, configured to query a respective corresponding material identification of each material box temporarily stored in a temporary storage shelf of each operating area; determine a temporary storage shelf where a material box corresponding to a material identification included in a newly added order is located; and assign the newly added order to an operating terminal of the operating area where the determined temporary storage shelf is located.

In one embodiment, the querying module 702 is further configured to query whether a material identification of a material on the temporary storage shelf is not included in any current unprocessed order. The temporary storage module 703 is further configured to trigger a second removal instruction when it is queried that there is a material identification that is not included in any current unprocessed order; the second removal instruction is used to instruct to remove a corresponding material box identified by the material identification that is not included in any current unprocessed order.

Figure 9:
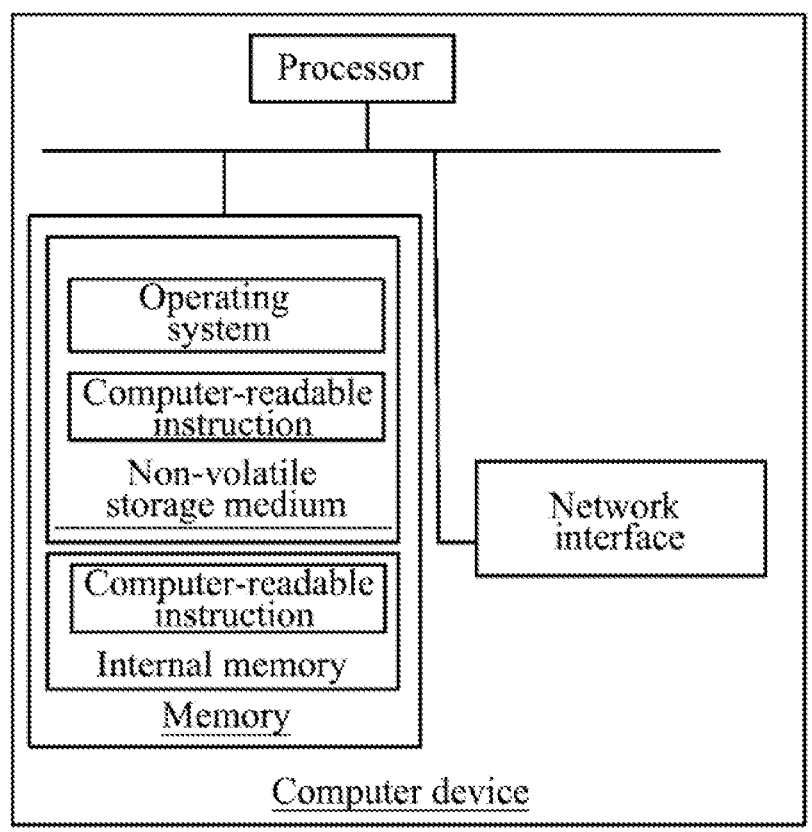
FIG. 9 is an internal structure diagram of a computer device in an embodiment.

FIG. 9 shows an internal structure diagram of a computer device in one embodiment. The computer device specifically can be the warehouse robot 110, the operating terminal 120 or the server 140 in FIG. 1. As shown in FIG. 9, the computer device includes a processor, a memory and a network interface connected through a system bus. Among them, the memory includes a non-volatile storage medium and an internal memory. The non-volatile storage medium of the computer device stores an operating system and can also store computer-readable instructions. When the computer-readable instructions are executed by the processor, the processor is enabled to realize the material handling method. The internal memory may also store computer-readable instructions, when the computer-readable instruction is executed by the processor, the processor is enabled to execute the material handling method. It can be understood by those skilled in the art that the structure shown in FIG. 9 is only a block diagram of a part of the structure related to the scheme of the present application, and does not constitute a limitation on the computer device to which the scheme of the present application is applied. A specific computer device may include more or less components than those shown in the figure, or combine some components, or have different component arrangements. Of course, the computer device can also include a display screen and an input apparatus. The display screen of the computer device can be a liquid crystal display screen or an electronic ink display screen, etc. The input apparatus can be a touch layer covered on the display screen, a key, a trackball or a touchpad set on a shell of the computer device, or an external keyboard, touchpad or mouse, etc.

In one embodiment, the material handling equipment provided in the present application can be implemented in the form of a computer-readable instruction, which can be run on the computer device as shown in FIG. 9, and the non-volatile storage medium of the computer device can store various instruction modules constituting the material handling equipment, such as the acquiring module 701, the querying module 702, the temporary storage module 703, and the like as shown in FIG. 7. The computer-readable instructions composed of various instruction modules cause the processor to execute the steps in the material handling method of each embodiment of the present application described in the description.

For example, the computer device shown in FIG. 9 can acquire a material identification through the acquiring module 701 in the material handling equipment 700 shown in FIG. 7; a material identified by the material identification is stored in a material box corresponding to the material identification. When an unprocessed order includes the material identification, the querying module 702 queries whether there is an available temporary storage unit in a temporary storage shelf. The temporary storage module 703 triggers a temporary storage instruction when there is an available temporary storage unit in the temporary storage shelf; the temporary storage instruction is used to instruct to perform a temporary storage behavior triggered according to the material identification on the temporary storage shelf.

In one embodiment, a computer device is provided, including a memory and a processor. The memory stores computer-readable instructions. When the computer-readable instructions are executed by the processor, enabling the processor to execute the steps of the above material handling method. Herein, the steps of the material handling method may be the steps in the material handling methods of the above various embodiments.

In one embodiment, a computer-readable storage medium is provided, in which computer-readable instructions are stored. When the computer-readable instructions are executed by a processor, enabling the processor to execute the steps of the above material handling method. Herein, the steps of the material handling method may be the steps in the material handling methods of the above various embodiments.

It can be understood by those skilled in the art that all or part of the processes in the methods of the foregoing embodiments can be implemented by instructing relevant hardware through a computer program. The program can be stored in a non-volatile computer readable storage medium. When the program is executed, it may include the procedures of the above various method embodiments. Among them, any reference to memory, storage, database or other media used in the various embodiments provided in the present application may include a non-volatile and/or volatile memory. The non-volatile memory may include a read only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), etc.

The various technical features of the above embodiments can be arbitrarily combined. In order to make the description concise, all possible combinations of the various technical features in the above embodiments are not described. However, as long as there is no contradiction in the combination of these technical features, it should be considered as the scope of the description.

The above embodiments only express several embodiments of the present application, and the description is relatively specific and detailed, but it cannot be understood as a limitation on the scope of the disclosure patent. It should be pointed out that for ordinary technical personnel in the art, several modifications and improvements can be made without departing from the concept of the present application, which are all within the protection scope of the present application. Therefore, the scope of protection of the present application patent shall be subject to the attached claims.

What is claimed is:

1. A material handling method, which is executed by a computer device, comprising:

acquiring a material identification; wherein a material identified by the material identification is stored in a material box corresponding to the material identification;

determining an unprocessed order comprises the material identification, then querying whether there is an available temporary storage unit in a temporary storage shelf; and determining there is an available temporary storage unit in the temporary storage shelf, then triggering a temporary storage instruction; wherein the temporary storage instruction is used to instruct to perform a temporary storage behavior triggered according to the material identification on the temporary storage shelf;

wherein the material box is located on a material box storage unit of a warehouse robot; the warehouse robot comprises multi-layer longitudinal arranged material box storage units; the method further comprises:

determining the number of layers of the material box storage unit where the material box is located; wherein the number of layers of the material box storage unit is positively related to a height of the material box storage unit from a ground;

determining the determined number of layers reaches a preset number of layers, then continuing to execute the querying whether there is an available temporary storage unit in the temporary storage shelf, and determining the determined number of layers does not reach the preset number of layers, then triggering a fetching instruction, wherein the fetching instruction is used to instruct to fetch a material corresponding to a material identification required by a current processing order from the material box.

2. The method according to claim 1, wherein the method further comprises:

determining there is no available temporary storage unit in the temporary storage shelf, then querying a respective corresponding comprehensive priority of each material box temporarily stored in the temporary storage shelf; and triggering a first removal instruction; wherein the first removal instruction is used to instruct to remove a material box corresponding to a lowest comprehensive priority.

3. The method according to claim 2, wherein the method further comprises:

moving the material box corresponding to the lowest comprehensive priority to a transmission device according to the first removal instruction; wherein the transmission device is configured to transfer the material box from a current operating area to other operating area.

4. The method according to claim 3, wherein the comprehensive priority is positively related to the number of times that a corresponding material box is demanded; the moving the material box corresponding to the lowest comprehensive priority to the transmission device comprises:

moving the material box corresponding to the minimum number of times of demands to the transmission device.

5. The method according to claim 1, wherein before the querying whether there is an available temporary storage unit in the temporary storage shelf, the method further comprises:

detecting whether the material box arrives at a current operating area in advance according to at least one of arrival time and arrival sequence of the material box; and determining the material box arrives at the current operating area in advance, then executing the querying whether there is an available temporary storage unit in the temporary storage shelf.

6. The method according to claim 1, wherein the method further comprises:

determining the number of the unprocessed orders comprising the material identification;

determining the determined number exceeds a preset number, then continuing to execute the querying whether there is an available temporary storage unit in the temporary storage shelf; and determining the determined number does not exceed the preset number, then triggering a fetching instruction; wherein the fetching instruction is used to instruct to fetch a material corresponding to a material identification required by a current processing order from the material box.

7. The method according to claim 1, wherein the temporary storage unit comprises a material box temporary storage unit and a material temporary storage unit, and the temporary storage instruction comprises a material box temporary storage instruction and a material temporary storage instruction; the determining there is an available temporary storage unit in the temporary storage shelf, then triggering a temporary storage instruction comprises at least one of:

determining there is an available material box temporary storage unit in the temporary storage shelf, then triggering the material box temporary storage instruction; wherein the material box temporary storage instruction is used to instruct to temporarily store a material box corresponding to the material identification in the temporary storage shelf; and determining there is an available material temporary storage unit in the temporary storage shelf, then triggering the material temporary storage instruction; wherein the material temporary storage instruction is used to instruct to temporarily store a material identified by the material identification in the temporary storage shelf.

8. The method according to claim 7, wherein the determining there is an available material temporary storage unit in the temporary storage shelf, then triggering the material temporary storage instruction comprises:

determining there is an available material temporary storage unit in the temporary storage shelf, then querying the number of materials identified by the material identification which required by the unprocessed order, and triggering a material temporary storage instruction corresponding to the number; wherein the material temporary storage instruction is used to instruct to temporarily store the materials corresponding to the number to a designated material temporary storage unit in the temporary storage shelf.

9. The method according to claim 7, wherein the method further comprises:

querying a respective corresponding material identification of each material box temporarily stored in a temporary storage shelf of each operating area;

determining a temporary storage shelf where a material box corresponding to a material identification comprised in a newly added order is located; and assigning the newly added order to an operating terminal of the operating area where the determined temporary storage shelf is located.

10. The method according to claim 1, wherein the method further comprises:
   querying whether a material identification of a material on the temporary storage shelf is not comprised in any current unprocessed order; and
   determining it is queried that there is a material identification that is not comprised in any current unprocessed order, then triggering a second removal instruction; wherein the second removal instruction is used to instruct to remove a corresponding material box identified by the material identification that is not comprised in any current unprocessed order.

11. A material handling equipment, comprising:
   a memory and a processor, wherein computer-readable instructions are stored in the memory, when the computer-readable instructions are executed by the processor, the processor is configured to:
   acquire a material identification; wherein a material identified by the material identification is stored in a material box corresponding to the material identification;
   determine an unprocessed order comprises the material identification, then query whether there is an available temporary storage unit in a temporary storage shelf; and
   determine there is an available temporary storage unit in the temporary storage shelf, then trigger a temporary storage instruction; wherein the temporary storage instruction is used to instruct to perform a temporary storage behavior triggered according to the material identification on the temporary storage shelf;
   wherein the material box is located on a material box storage unit of a warehouse robot; the warehouse robot comprises multi-layer longitudinal arranged material box storage units, and the processor is further configured to:
   determine the number of layers of the material box storage unit where the material box is located; wherein the number of layers of the material box storage unit is positively related to a height of the material box storage unit from a ground;
   determine the determined number of layers reaches a preset number of layers, then continue to execute the querying whether there is an available temporary storage unit in the temporary storage shelf; and
   determine the determined number of layers does not reach the preset number of layers, then trigger a fetching instruction, wherein the fetching instruction is used to instruct to fetch a material corresponding to a material identification required by a current processing order from the material box.

12. The material handling equipment according to claim 11, wherein the processor is further configured to:
   determine there is no available temporary storage unit in the temporary storage shelf, then
   query a respective corresponding comprehensive priority of each material box temporarily stored in the temporary storage shelf; and
   trigger a first removal instruction; wherein the first removal instruction is used to instruct to remove a material box corresponding to a lowest comprehensive priority.

13. The material handling equipment according to claim 12, wherein the processor is further configured to:
   move the material box corresponding to the lowest comprehensive priority to a transmission device according to the first removal instruction; wherein the transmission device is configured to transfer the material box from a current operating area to other operating area.

14. The material handling equipment according to claim 13, wherein the comprehensive priority is positively related to the number of times that a corresponding material box is demanded; and the processor is further configured to:
   move the material box corresponding to the minimum number of times of demands to the transmission device.

15. The material handling equipment according to claim 11, wherein the processor is further configured to:
   determine the number of the unprocessed orders comprising the material identification;
   determine the determined number exceeds a preset number, then continue to execute the querying whether there is an available temporary storage unit in the temporary storage shelf; and
   determine the determined number does not exceed the preset number, then trigger a fetching instruction; wherein the fetching instruction is used to instruct to fetch a material corresponding to a material identification required by a current processing order from the material box.

16. The material handling equipment according to claim 11, wherein the processor is further configured to perform at least one of the following steps:
   determining there is an available material box temporary storage unit in the temporary storage shelf, then triggering the material box temporary storage instruction; wherein the material box temporary storage instruction is used to instruct to temporarily store a material box corresponding to the material identification in the temporary storage shelf; and
   determining there is an available material temporary storage unit in the temporary storage shelf, then triggering the material temporary storage instruction; wherein the material temporary storage instruction is used to instruct to temporarily store a material identified by the material identification in the temporary storage shelf.

17. The material handling equipment according to claim 11, wherein the processor is further configured to:
   query whether a material identification of a material on the temporary storage shelf is not comprised in any current unprocessed order; and
   determine it is queried that there is a material identification that is not comprised in any current unprocessed order, then trigger a second removal instruction; wherein the second removal instruction is used to instruct to remove a corresponding material box identified by the material identification that is not comprised in any current unprocessed order.

18. A non-transitory storage medium storing computer-readable instructions, wherein the computer-readable instructions, when executed by one or more processors, enable the one or more processors to execute steps below:
   acquiring a material identification; wherein a material identified by the material identification is stored in a material box corresponding to the material identification;
   determining an unprocessed order comprises the material identification, then
   querying whether there is an available temporary storage unit in a temporary storage shelf; and
   determining there is an available temporary storage unit in the temporary storage shelf, then triggering a temporary storage instruction; wherein the temporary storage instruction is used to instruct to perform a temporary storage behavior triggered according to the material identification on the temporary storage shelf;

wherein the material box is located on a material box storage unit of a warehouse robot the warehouse robot comprises multi-layer longitudinal arranged material box storage units, and the processor is further configured to:

determining the number of layers of the material box storage unit where the material box is located; wherein the number of layers of the material box storage unit is positively related to a height of the material box storage unit from a ground;

determining the determined number of layers reaches a preset number of layers, then continuing to execute the querying whether there is an available temporary storage unit in the temporary storage shelf, and determining the determined number of layers does not reach the preset number of layers, then triggering a fetching instruction, wherein the fetching instruction is used to instruct to fetch a material corresponding to a material identification required by a current processing order from the material box.

* * * * *